United States Patent
Nan et al.

(10) Patent No.: US 9,141,262 B2
(45) Date of Patent: Sep. 22, 2015

(54) EDGE-BASED HOOKING GESTURES FOR INVOKING USER INTERFACES

(75) Inventors: Jennifer Nan, Seattle, WA (US); Jesse Clay Satterfield, Seattle, WA (US); Zach Robinson, Kirkland, WA (US); Robert Jarrett, Seattle, WA (US); Patrice L. Miner, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/345,383

(22) Filed: Jan. 6, 2012

(65) Prior Publication Data

US 2013/0179781 A1 Jul. 11, 2013

(51) Int. Cl.
*G06F 3/0481* (2013.01)
*G06F 3/0482* (2013.01)
*G06F 3/0484* (2013.01)

(52) U.S. Cl.
CPC ............ *G06F 3/0482* (2013.01); *G06F 3/0484* (2013.01)

(58) Field of Classification Search
None
See application file for complete search history.

(56) References Cited

U.S. PATENT DOCUMENTS

| 5,406,307 | A * | 4/1995 | Hirayama et al. | 715/800 |
|---|---|---|---|---|
| 5,603,053 | A * | 2/1997 | Gough et al. | 710/5 |
| 5,657,049 | A * | 8/1997 | Ludolph et al. | 715/856 |
| 6,346,935 | B1 * | 2/2002 | Nakajima et al. | 345/173 |
| 7,251,782 | B1 | 7/2007 | Albers | |
| 7,304,638 | B2 * | 12/2007 | Murphy | 345/173 |
| 7,689,916 | B1 * | 3/2010 | Goel et al. | 715/711 |
| 7,898,529 | B2 * | 3/2011 | Fitzmaurice et al. | 345/173 |
| 8,134,727 | B1 * | 3/2012 | Shmunis et al. | 358/1.15 |
| 8,171,431 | B2 | 5/2012 | Grossman et al. | |
| 8,245,156 | B2 * | 8/2012 | Mouilleseaux et al. | 715/834 |
| 8,334,871 | B2 * | 12/2012 | Hamilton et al. | 345/473 |
| 2002/0105553 | A1 * | 8/2002 | Segre | 345/862 |
| 2003/0107604 | A1 | 6/2003 | Ording | |
| 2004/0212617 | A1 * | 10/2004 | Fitzmaurice et al. | 345/440 |
| 2005/0091612 | A1 * | 4/2005 | Stabb et al. | 715/816 |
| 2005/0114778 | A1 * | 5/2005 | Branson et al. | 715/711 |
| 2005/0125739 | A1 | 6/2005 | Thompson | |
| 2006/0055670 | A1 | 3/2006 | Castrucci | |

(Continued)

OTHER PUBLICATIONS

Microsoft Windows, The Start Menu (overview) Dec. 19, 2010. www.windows.microsoft.com/en-US/windows-vista/The-Start-menu-overview.*

(Continued)

*Primary Examiner* — Matt Kim
*Assistant Examiner* — Mahelet Shiberou
(74) *Attorney, Agent, or Firm* — Bryan Webster; Kate Drakos; Micky Minhas (57) ABSTRACT

Presented herein are techniques for invoking user interfaces in graphical computing environments involving "hooking" gestures applicable to an edge of a display. These gestures involve positioning a pointer near an edge of the display depicting the environment, and then moving the cursor to a second location that is distanced from but near the first location (e.g., moving the pointer into a corner of the display, and then toward the center of the display, or to a midpoint of an adjacent edge of the display), resulting in the presentation of the user interface under the pointer at the second location. Variations include presenting a preview of the user interface (e.g., a subset of a user interface menu) at the second location while the pointer is in the first location, and refraining from presenting the user interface upon failing to complete the gesture or receiving extraneous input before completing the gesture.

20 Claims, 6 Drawing Sheets

(56) References Cited

U.S. PATENT DOCUMENTS

| | | | |
|---|---|---|---|
| 2006/0156247 A1* | 7/2006 | McCormack et al. | 715/767 |
| 2007/0067798 A1* | 3/2007 | Wroblewski | 725/37 |
| 2007/0180381 A1* | 8/2007 | Rice et al. | 715/711 |
| 2007/0266342 A1 | 11/2007 | Chang et al. | |
| 2007/0291007 A1* | 12/2007 | Forlines et al. | 345/173 |
| 2008/0052637 A1 | 2/2008 | Ben-Yoseph et al. | |
| 2008/0313538 A1* | 12/2008 | Hudson | 715/702 |
| 2009/0174679 A1* | 7/2009 | Westerman | 345/173 |
| 2009/0183077 A1 | 7/2009 | Hakim et al. | |
| 2010/0057566 A1* | 3/2010 | Itzhak | 705/14.53 |
| 2010/0106607 A1 | 4/2010 | Riddiford | |
| 2010/0157157 A1 | 6/2010 | Yi | |
| 2010/0192102 A1* | 7/2010 | Chmielewski et al. | 715/834 |
| 2011/0138313 A1 | 6/2011 | Decker | |
| 2011/0279461 A1* | 11/2011 | Hamilton et al. | 345/473 |
| 2011/0320978 A1* | 12/2011 | Horodezky et al. | 715/823 |
| 2012/0079414 A1 | 3/2012 | Eischeid et al. | |
| 2012/0161791 A1* | 6/2012 | Shaw | 324/658 |
| 2012/0180001 A1* | 7/2012 | Griffin et al. | 715/863 |
| 2012/0254808 A1* | 10/2012 | Gildfind | 715/863 |
| 2012/0272181 A1* | 10/2012 | Rogers et al. | 715/784 |

OTHER PUBLICATIONS

Stebih, Rudy, "Windows 8 Mouse and Keyboard Commands"—Published Date: Sep. 21, 2011, http://www.helpdesktv.ca/windows/windows-8-mouse-and-keyboard-commands.html.

Danish, "Win7sé Brings Mac-Like Screen Corners to Windows 7 & Windows 8"—Published Date: Nov. 13, 2011, http://technomondo.com/2011/11/13/win7se-brings-mac-like-screen-corners-to-windows-7-windows-8/.

Yang; et al., "Dual-Surface Input: Augmenting One-Handed Interaction with Coordinated Front and Behind-the-Screen Input"—Published Date: Sep. 18, 2009, Proceedings: MobileHCI '09 Proceedings of the 11th International Conference on Human-Computer Interaction with Mobile Devices and Services, http://www.cs.ualberta.ca/~wfb/publications/C-2009-MobileHCI-Yang.pdf.

"What You Should Expect from the Windows 7 Beta", Nov. 23, 2011, http://www.howtogeek.com/howto/the-geek-blog/whaat-you-should-expect-from-the-windows-7-beta, 17 pgs.

"Working with Windows", Nov. 23, 2011, http://h30097.www3hp.com/docs/base_doc/documentation/F40F_html/AQ917BTE/docu_004.htm, 14 pgs.

"Shottrack for Windows VoD Software and Analysis", Nov. 23, 2011, http://www.matrixconsult.com.au/MATRIX_Web_Files/ShotTrack_Software_Manual.pdf, 47 pgs.

"Window Desktop", Nov. 23, 2011, http://pjnicholson.com/windowsdesktop.htm, 4 pgs.

"KDE 4.0 Visual Guide: Desktop", Nov. 23, 2011, http://kde.org/announdements/4.0/desktop/php, 8 pgs.

Non-Final Office Action cited in U.S. Appl. No. 13/345,263 dated Oct. 24, 2013, 19 pgs.

Reply Non-Final Office Action cited in U.S. Appl. No. 13/345,263 dated Jan. 24, 2014, 14 pgs.

Notice of Allowance cited in U.S. Appl. No. 13/345,263 dated Mar. 31, 2014, 24 pgs.

* cited by examiner

EDGE-BASED HOOKING GESTURES FOR INVOKING USER INTERFACES

BACKGROUND

Within the field of computing, many scenarios involve the presentation of user interfaces within a graphical computing environment, such as windows, icons, menu bars, toolbars, and widgets, as well as a background region, such as a desktop presented as a backdrop for the graphical computing environment. In particular, such user interfaces may present various types of visual controls for interacting with the graphical computing environment, such as adjustable properties of the environment, adjustable settings of respective applications, and properties of regions associated with the applications (e.g., opening, closing, and repositioning windows for respective applications). A user may manipulate a pointing device (e.g., a mouse, trackball, touchpad, drawing tablet, stylus, or touchscreen device) to manipulate a pointer within the graphical environment in order to interact with the user interfaces presented therein.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Although the presentation of visual controls within the graphical computing environment may enable various operations for respective applications or the environment, such presentation may consume valuable space on the display of the device. In some scenarios, such consumption may be regarded as an inefficient use of display space that diminishes the amount of display space usable by the application. For example, settings may be accessible through interaction with a visual control such as a button or menu, but such settings may be infrequently or rarely accessed by the user, and it may not be desirable to present such visual controls in a continuous manner that reduces the size of the display used to present other aspects of the graphical computing environment, such as the output of the applications. Moreover, such visual controls are often presented in a large non-interactive display element, such as a menu bar displayed along the entire top width of the region where only a small portion of the menu bar is used to display a small set of options. Therefore, it may be desirable to reduce the amount of "chrome" (e.g., attached visual controls and embedding visual elements) presented within the graphical computing environment in order to maximize the area of display space that is available for other uses. However, it is still desirable to enable the user to access the operations for which the visual elements may have been presented.

Presented herein are techniques for enabling users to invoke a presentation of a user interface within a graphical computing environment through the detection of gestures performed with the pointer. Such techniques may particularly useful when implemented in a "chromeless" manner, e.g., where the graphical computing environment refrains from indicating the availability of the user interface before the start of the performance of the gesture. These techniques involve detecting a positioning of the pointer at a first location near an edge of the display, followed by a movement of the pointer toward a second location that is located near, but at a distance from, the first location (e.g., the first location comprising a corner of the display adjoining two edges, and the second location comprising a midpoint of one of the edges). This gesture may invoke a presentation of a user interface region of the user interface, such that the user interface region that is positioned near the first location, but that does not include the first location, such that the user interface does not occlude other visual controls that may be positioned at the first location (e.g., other visual controls positioned in the corner of the display). Additionally, upon detecting a "hovering" of the pointer at the first location, the device may present a preview of the user interface at the second location, thus encouraging the user to move the pointer toward the second location where the full user interface is presented.

The configuration of the device to detect such gestures as requests to invoke the user interface may present several advantages. As a first example, the edges of a display, and even more so the corners of the display, are often easily accessible to a user (according to some consequences of Fitts' Law), and a user may rapidly invoke such gestures, and possibly without regard to the current position of the pointer and even without looking at the display. As a second example, such gestures are not currently associated with any known functionality, and users may be easily and intuitively trained to utilize such gestures to invoke the user interface. As a third example, such gestures may be detectable with high accuracy, a low degree of ambiguity, and a comparatively simple analytic process (as contrasted with gestures that involve complex shape analysis, such as the drawing of symbols such as letters). These and other advantages may be achievable through the implementation of the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

A. Introduction

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a graphical computing environment comprising various user interfaces, such as windows, menu bars, toolbars, notification dialogs, icons representing applications or documents, and widgets embedded in a desktop. Such graphical computing environments may be generated on a device, e.g., by first rendering a background color or background image; by rendering one or more user interfaces for each application executing on the device; and by presenting the rendering on a display component of the device, such as a monitor. Some user interfaces may be associated with an application executing on the device, and may be configured to present visual output from the application and/or convey input through the user interface to the application. Such applications may include user applications, renderings of media objects, configuration dialogs, games, operating system applications (e.g., a file explorer), and graphical interfaces for background service (e.g., a notification icon stored in a notification icon area).

A user may be permitted to interact with the user interfaces presented in the graphical computing environment. As one such example, the device may comprise a pointing device, such as a mouse, a trackball, a trackpad, a drawing tablet, a touchscreen, a stylus, a targeting element such as an infrared emitter, and/or a camera configured to detect a manual pointing gesture of a user at the display component. These pointing devices may be used to control a pointer presented on the display (e.g., represented by a cursor such as an arrow), and the user may utilize the pointer to select, activate, and interact with various user interfaces; e.g., the user may slide a mouse on a flat surface to achieve corresponding movement of the pointer, may position the pointer over a user interface of interest, and may click a button on the mouse to indicate a selection of the user interface. The device may be configured to support many such operations through the pointing device (e.g., clicking with one or more particular buttons, double-clicking, dragging an item such as an icon, or creating a marquee or "lasso" to select an area or items of interest). The device may also evaluate the input of the pointing device to identify gestures performed with the pointer (e.g., a "shaking" of the cursor) and/or of the pointing device (e.g., a single- or multi-touch gesture performed on a touchpad that is to be processed in lieu of corresponding movements on the touchpad). Such manipulations may enable the execution of many types of activities, including selecting and/or unselecting items; invoking, switching to, or terminating particular applications; and zooming into or out of a portion of the graphical computing environment.

In addition to operations invoked solely through the input of the pointing device, pointer-based user interfaces are frequently used in conjunction with various types of visual controls embedded in the user interface, such as depressable buttons, selectable radio buttons, checkboxes, sliders, lists, numeric up/down controls, menus and pickers. For example, a window of an application is often presented with a visual frame; a set of buttons at a top corner of the window for frequently invoked window management functions, such as maximizing, restoring, minimizing, and closing an application; and a top menu bar providing a set of invokable operations exposed by the application. These controls may be applied by default to the window by the graphical computing environment, or may be specified by the application associated with the window, and may be positioned in an independent, floating, detachable, dockable, and/or attached manner with respect to the window. Some familiar examples involve techniques for achieving a repositioning of a window on the display. Such repositioning may involve, e.g., altering the location of a window on the display; resizing the window; switching the window to a particular view mode (e.g., a maximized, fullscreen, windowed, or hidden view mode); and moving the window to a different display (e.g., from a first monitor to a second monitor connected to the same device; from a first virtual display space to a second virtual display space of the same device; or to a display component of a different device). Because windows are frequently repositioned in window-based graphical computing environments, such devices often provide several ways to invoke the repositioning of a window. For example, the maximize, restore, and minimize buttons attached to a window enable the repositioning of the window at predefined sizes and locations; the graphical frame of a window enables a user to position the pointer over an edge of the window and drag to adjust the size of the window; and menu options in a standard application menu enabling the maximizing, restoring, and minimizing of the region. Additional input options may be included to reposition the window without the use of a visual repositioning control; e.g., keyboard shortcuts may be provided to invoke the maximize, restore, and minimize commands, and a "throw" pointer gesture may be implemented to enable a user to "grab" a window with the pointer and rapidly move the pointer to a particular location of the display in order to "throw" it into that location.

Figure 1:
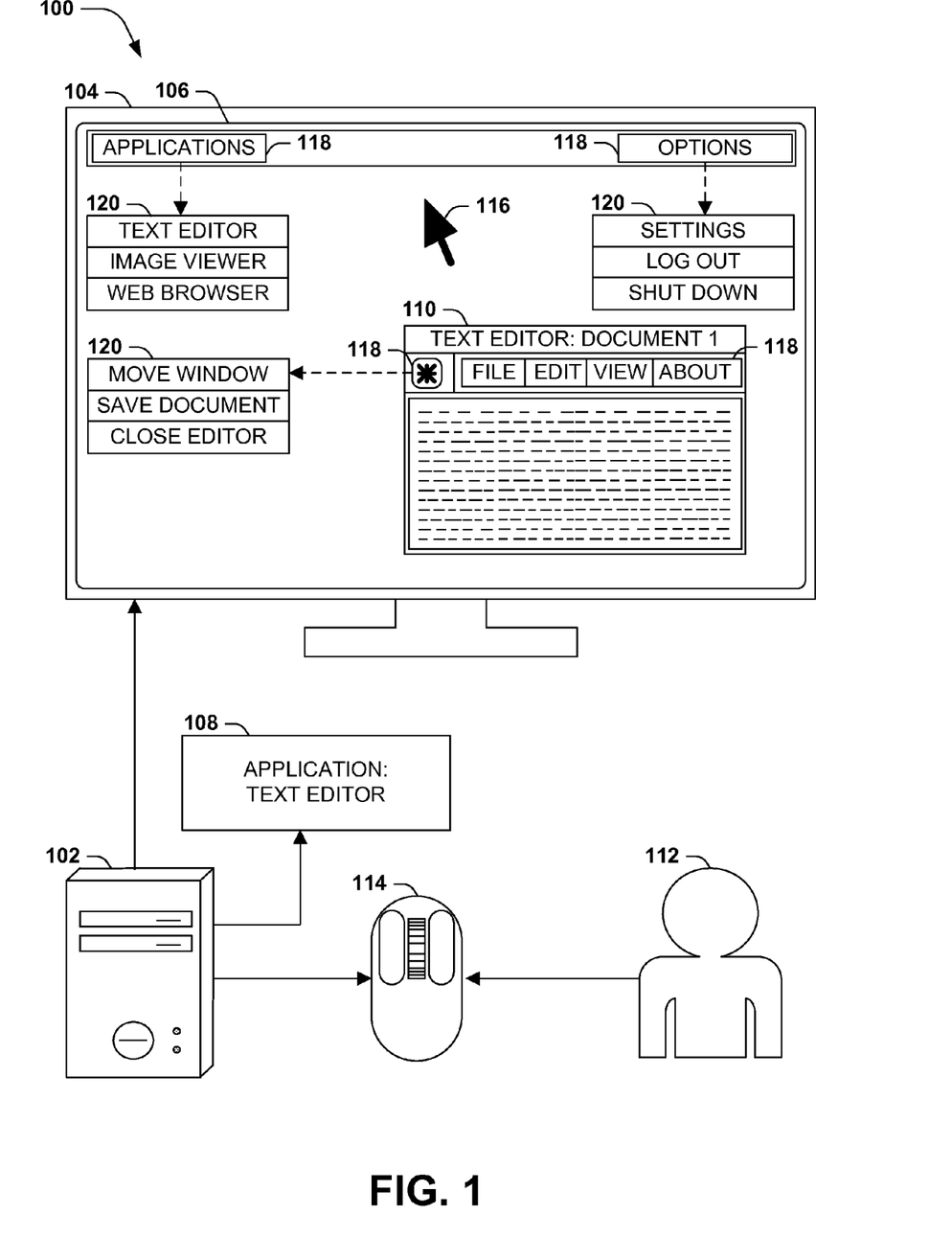
FIG. 1 is an illustration of an exemplary scenario featuring a graphical computing environment including visual controls for invoking user interfaces.

FIG. 1 presents an illustration of an exemplary scenario 100 featuring a device 102 having a display 104 (e.g., a liquid crystal display (LCD) monitor) whereupon is presented a graphical computing environment 106 within which applications 108 may be executed, and may render output through a window 110 of the graphical computing environment 106. In order to interact with the graphical computing environment 106, a user 112 may manipulate a pointing device 114, such as a mouse, to control a pointer 116 positioned at a location within the graphical computing environment 106. For example, the user 112 may position the pointer 116 over a visual control 118 within the window 110, such as a button positioned at the top-left corner of the window 110 providing access to general window-management functions, and a menu bar presenting menus of application-specific operations. While the window 110 is activated (e.g., while the pointer 116 is positioned over the window 110, or while the window 110 is selected as an input focus), input received from the user 112 may be directed to the application 108 associated with the window 110. For example, clicking on the button may result in the presentation of a first user interface 120 (e.g., a pop-out menu presenting a selectable list of window management operations). Additional visual controls 118 may be presented by the graphical computing environment 106, such as an application launcher that, upon activation with the pointer 116, presents a second user interface 120 comprising a list of invokable applications, and a settings button that, upon activation with the pointer 116, presents a third user interface 120 comprising a list of operations applicable to the graphical computing environment 106 (e.g., displaying settings within the graphical computing environment 106, logging out of a user account, and shutting down the graphical computing environment 106). In this manner, visual elements 118 may be presented within the graphical computing environment 106 to enable access to various user interfaces 120 associated with applications 108 and the graphical computing environment 106.

However, the implementation of visual controls 118 for respective windows 110 may consume space within the graphical computing environment 106. For example, in the exemplary scenario 100 of FIG. 1, a significant amount of the display space is consumed by visual controls 118 such as the top menu bar, the application launcher button, the options button, and the visual controls 118 embedded in the window 110. Moreover, some of these elements are embedded in non-interactive visual elements in order to provide visual alignment and/or consistency among windows 110; e.g., a menu bar may span the entire width of a window 110 but may be only partially utilized by embedded visual controls 118, and the remainder may present non-interactive and unhelpful visual elements within the graphical computing environment 106. Moreover, the functionality provided by a visual control 118 may be redundant with other visual controls 118; may be invoked only occasionally or rarely, despite the ubiquitous presentation of the visual control 118; and may be handled entirely by the logic of the application 108 (e.g., the application 108 may present an option within the window 110 to exit the application at an appropriate time, thereby rendering a "close" button irrelevant and confusing).

These and other considerations may encourage a reduction in the amount of redundant, infrequently invoked, and/or non-functional visual elements ("chrome") within a graphical computing environment 106. However, users 112 may nevertheless wish to invoke the functionality provided by the omitted visual controls 118. Therefore, it may be desirable to design the graphical computing environment 106 to provide such functionality other than through the use of "chrome." One such technique is the implementation of "gestures," whereby a particular motion of the pointer 116 may be associated with a particular functionality, such as the "marquee" or "lasso" gesture whereby the drawing of a rectangle enclosing a set of items in a list results in a selection of the enclosed items, or double-clicking a button on a pointing device to activate an item indicated by the pointer 116. Moreover, it may be desirable to devise gestures that may be distinctively entered by the user 112; that may be efficiently and accurately distinguished by computational analysis from other gestures and other forms of input); and that are intuitively associated with the invoked functionality (e.g., a recognizable multi-touch gesture may involve a spreading or pinching of two locations may be intuitively associated, respectively, with a zoom-in operation or a zoom-out operation). The configuration of the device 102 to recognize a distinctive set of gestures, each enabling access to frequently invoked functionality in an unambiguous manner, may enable a considerable reallocation of the display space of the graphical computing environment 106 from "chrome" to the output of applications 108.

B. Presented Techniques

Presented herein are techniques for facilitating the invocation of a user interface 120 through gestures that are not presently associated with other functionality, that are readily distinguished from other gestures and forms of input, and that are intuitively associated with the associated functionality of invoking a user interface 120. In particular, it may be desirable to devise a gesture that is associated with a location near an edge of a display 104 of the device 102, which, according to Fitts' Law, is readily accessible to users 112. However, due to this advantageous accessibility, many graphical computing environments 106 may position the user interface 120 near an edge of the display 104, and/or may implement gestures or other forms of input with respect to an edge. These alternate uses of the edge of a display 104 may cause two undesirable consequences: first, the gesture may already be associated with other forms of input that are associated with the same edge; second, presenting the user interface 120 at the first location where the gesture begins may result in an overlapping of other visual elements that are also presented near the same edge. Moreover, it may be further desirable to present the invoked user interface 120 near the edge only after the gesture is completed, because presenting the user interface 120 near the first location before the gesture is completed may result in an overlapping of other visual elements near the edge even if the user 112 did not intend to invoke the user interface 120.

For at least these reasons, it may be desirable to devise gestures that conclude at a second location that is near but distanced from the first location where the gesture is initiated, where the movement of the pointer 116 from the first location to the second location may unambiguously identify a request to invoke the user interface 120. As an additional option, while the invoked user interface 120 may be presented only after the gesture is completed, the graphical computing environment 118 may present a preview of the user interface 120 at the second location. This preview presentation may both suggest the availability of the user interface 120 to the user 112 when the gesture is commenced and may prompt the user 112 with the movement to complete the gesture. Moreover, the presentation at the second location (near but distanced from the first location near the edge of the display 106) may avoid overlapping visual elements presented at the first location, particularly before the intent of the user 112 to invoke the user interface 120 is unambiguously established through the completion of the gesture.

Figure 2:
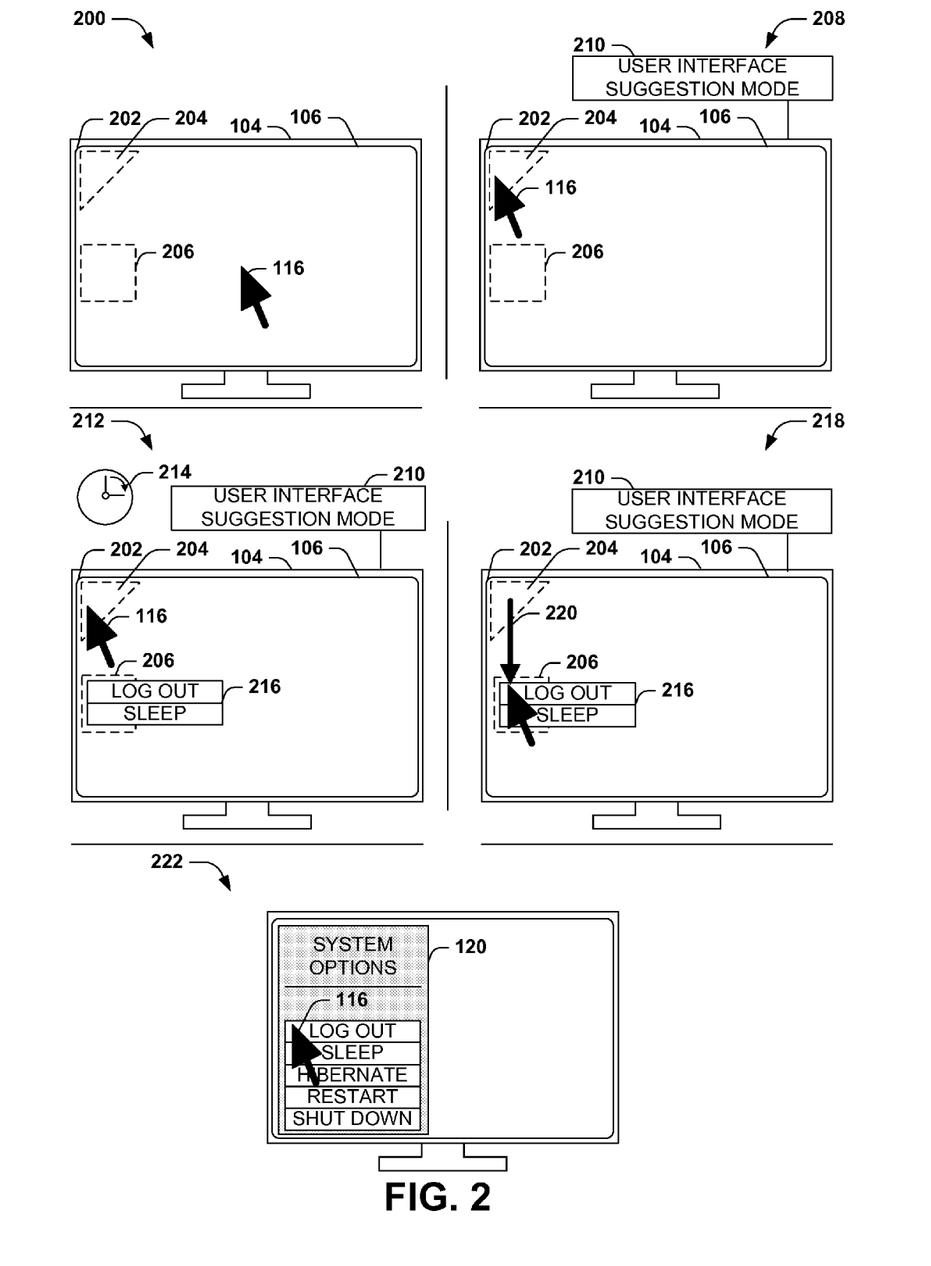
FIG. 2 is an illustration of an exemplary scenario featuring the detection of a gesture within a graphical computing environment to invoke a user interface in accordance with the techniques presented herein.

FIG. 2 presents an illustration of an exemplary scenario (presented as a sequence of time points) including the performance of an exemplary gesture devised to invoke a user interface 120. In this exemplary scenario, at a first time point 200, within the graphical computing environment 106 presented on a display 104, a gesture may be devised that is associated with a particular edge 202 of the display 104 (e.g., a corner adjoining a horizontal edge and a vertical edge of the display 104). In particular, the gesture may be associated with a first location 204 that is located near the edge 202 where the gesture is commenced (e.g., a small triangular area of the corner of the display 104), and a second location 206 that is near but distanced from the first location 204 and where the gesture is completed (e.g., a small square area near a midpoint of the vertical edge associated with the corner). At this first time point 200, the pointer 116 may be positioned at an arbitrary position within the graphical computing environment 106, but at a second time point 208, the user 112 may move the pointer 116 to enter the area comprising the first location 204, and the device 102 may enter a user interface suggestion mode 210 (e.g., the detection of input initiating but not yet completing a gesture whereby a user interface 120 may be invoked). At a third time point 212, as optional additional aspects of this exemplary gesture, the graphical computing environment 106 may detect a hovering of the pointer 116 (for a hover duration 214) at the first location 204, and may therefore present a preview 216 of the user interface 120 at the second location 206. The preview 216 may both suggest the availability of the user interface 120 to the user 112, and may also indicate to the user 112 the second location 206 where the pointer 116 may be moved to complete the gesture. Moreover, the second location 206 may be selected so that the preview 216, when displayed at the second location 206, does not overlap visual elements at the first location 204. At a fourth time point 218, a movement 220 of the pointer 116 to the second location 206 may result in a completion of the gesture, result in, at a fifth time point 222, a presentation of the user interface 120 along the vertical edge of the display 104 where the gesture has been performed. In this manner, the user interface 120 may be conveniently invoked by an unambiguous gesture without reliance on chrome, and by suggesting the availability of the user interface 120 by presenting a preview that does not occlude other visual elements presented at the first location 204, in accordance with the techniques presented herein.

C. Exemplary Embodiments

Figure 3:
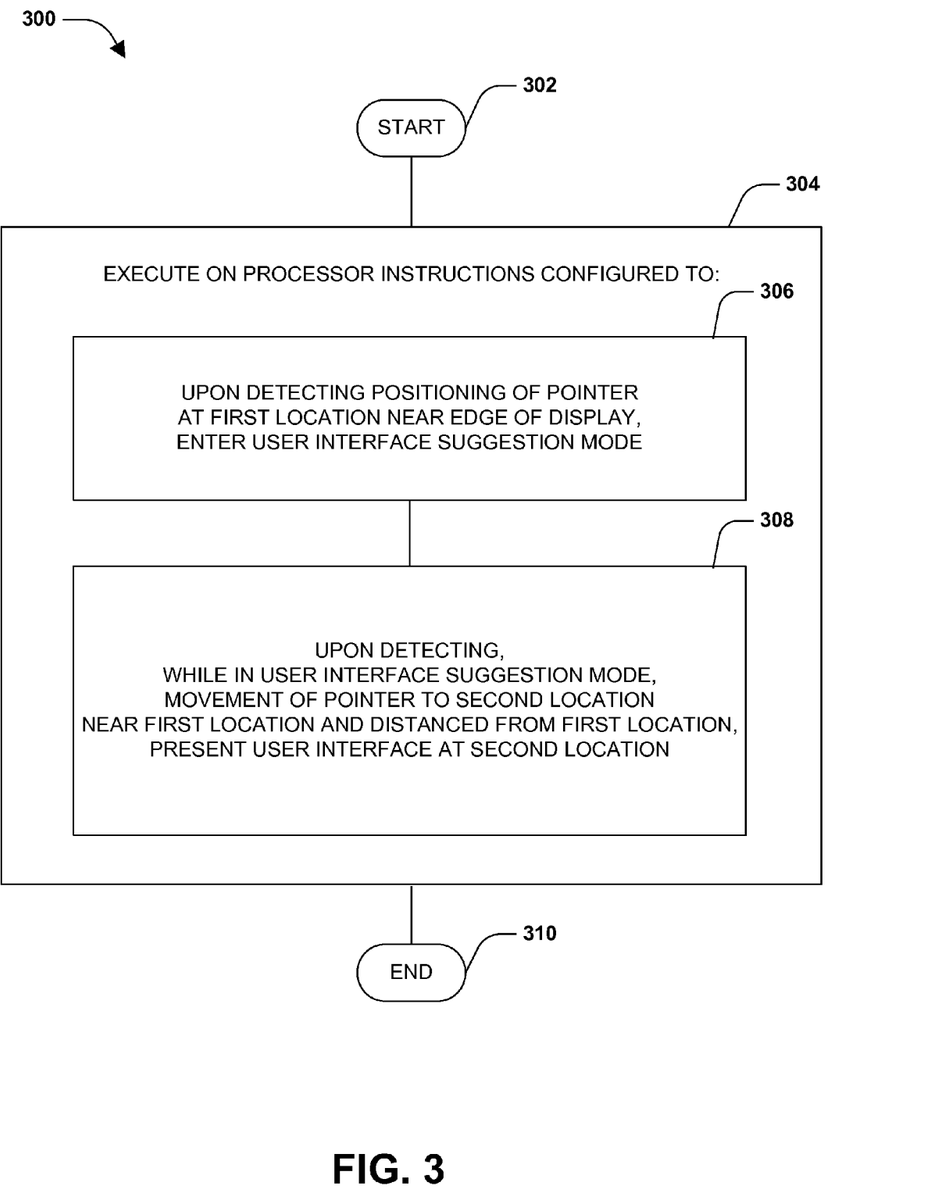
FIG. 3 is a flow chart illustrating an exemplary method of presenting a user interface within a graphical computing environment.

FIG. 3 presents a first exemplary embodiment of the techniques presented herein, illustrated as an exemplary method 300 of presenting user interfaces 120 within a graphical computing environment 106. The exemplary method 300 may involve a device 102 having a processor, a display 104, and a pointing device 114 associated with a pointer 116 presented within the graphical computing environment 106. The exemplary method 300 also involves a set of instructions stored in a memory component of the device 102 (e.g., a memory circuit, a platter of a hard disk drive, a solid-state storage device, or a magnetic and/or optical disc) that, when executed on the processor of the device, causes the device to apply the techniques presented herein. Accordingly, the exemplary method 300 begins at 302 and involves executing 304 the instructions on the processor of the device 102. More specifically, the instructions are configured to, upon detecting a positioning of the pointer 116 at a first location 506 near an edge 202 of the display 104, enter 306 a user interface suggestion mode 210. The instructions are also configured to, upon detecting, while in the user interface suggestion mode 210, a movement 220 of the pointer 116 to a second location 206 that is near the first location 204 and that is distanced from the first location 204, present 308 the user interface 120 at the second location 206. Having achieved the presentation of the user interface 120 according to the techniques presented herein, the exemplary method 300 ends at 310.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 4:
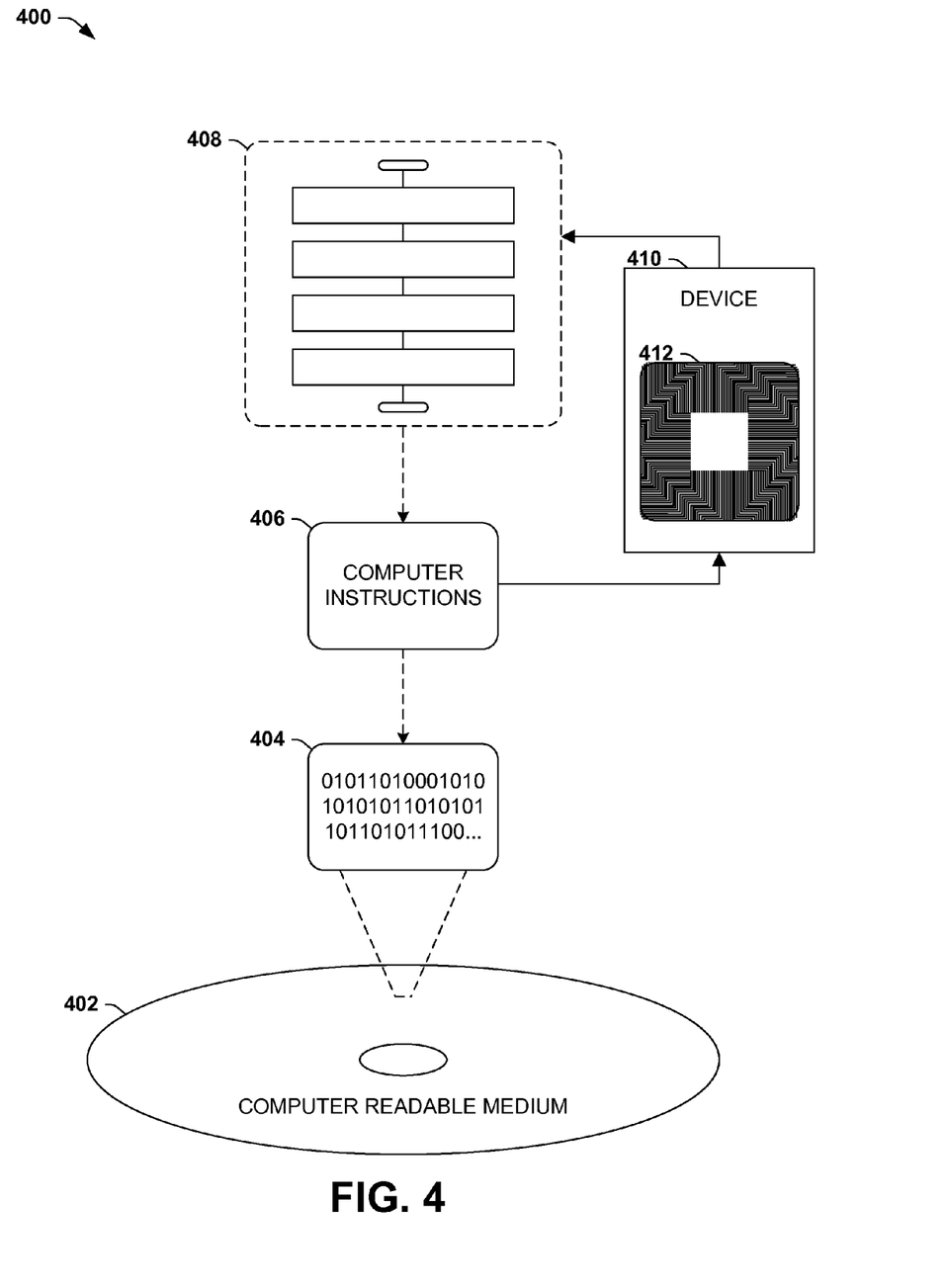
FIG. 4 is an illustration of an exemplary computer-readable medium comprising processor-executable instructions configured to embody one or more of the provisions set forth herein.

An exemplary computer-readable medium that may be devised in these ways is illustrated in FIG. 4, wherein the implementation 400 comprises a computer-readable medium 402 (e.g., a CD-R, DVD-R, or a platter of a hard disk drive), on which is encoded computer-readable data 404. This computer-readable data 404 in turn comprises a set of computer instructions 406 configured to operate according to the principles set forth herein. In one such embodiment, the processor-executable instructions 406 may be configured to perform a method of presenting a user interface within a graphical computing environment, such as the exemplary method 300 of FIG. 3. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3) to confer individual and/or synergistic advantages upon such embodiments.

D1. Scenarios

A first aspect that may vary among embodiments of these techniques relates to the scenarios wherein such techniques may be utilized.

As a first variation of this first aspect, these techniques may be utilized with many types of devices 102, such as servers, workstations, laptop or palmtop computers, tablets, phones, personal data assistants, media players, game consoles, and appliances.

As a second variation of this first aspect, these techniques may be utilized with many types of displays 104, such as active- or passive-matrix liquid crystal displays (LCD), organic or traditional light-emitting diode (LED) displays, cathode-ray-tube (CRT) displays, and projectors. Such displays 104 may also exhibit various features, including various physical sizes, aspect ratios, resolutions, pixel densities, adjustable properties, and three-dimensional image simulation. The device 102 may also have one or multiple displays 104 arranged in various ways (e.g., an aggregate desktop presented seamlessly across the displays 104, a set of distinct and isolated display spaces presented on different displays 104, or a mirrored desktop that is partially or wholly redundantly presented on several displays 104). Additionally, in some variations, a first device 102 may apply the techniques presented herein for windows 110 presented on a display 104 of a second device 104 (e.g., a terminal services client presenting on a display 104 the graphical computing environment generated by a terminal server).

As a third variation of this first aspect, these techniques may be utilized with many types of pointing devices 114, such as a mouse, trackball, trackpad, pointing stick, joystick, or drawing tablet. The pointing device 114 may also be incorporated in the display 104, such as a magnetic or capacitive touch-sensitive display capable of detecting touch by a finger of a user 112 or by a stylus. Other pointing devices 114 may include a camera, and may correlate movements of the pointer 116 with movements of a user (e.g., applying image evaluation techniques to detect the body position and physical gestures of the user 112) or a pointing device, such as an infrared emitter. Such pointing devices 114 may also include various properties that may affect the pointer 116, such as sensitivity, acceleration, the inclusion of buttons and/or wheels, the detection of various axes of movement (possibly including a third dimensional axis and/or gyroscopic sensors detecting device attitude such as tilt), and sensitivity to the touch of the user, as in a touch-sensitive mouse. As a further variation, such pointing devices 114 may generally correlate with the pointer 116 in various modes, such as an absolute correlation (e.g., on a touch-sensitive display 104, the location touched by the user 112 is the location of the point 116; or on a touchpad, the size and dimensions of the touchpad may be scaled to the size and dimensions of the display 104, such that touching a particular location on the touchpad positions the pointer 116 at the corresponding scaled position on the display 104) and a relative correlation (e.g., input from a mouse or touchpad may be interpreted not as a location of the pointer 116 on the display 104, but as directional motion of the pointer 116 within the graphical computing environment 106).

As a fourth variation of this first aspect, these techniques may be utilized to invoke many types of user interfaces 120. As a first such example, the user interfaces 120 may be associated with the graphical computing environment 104 and/or one or more applications 108. As a second such example, the user interfaces 120 may include many types of visual elements 118, such as modal or modeless windows, interactive and non-interactive dialogs, toolbars, menu bars, renderings of media objects such as documents and images, icons, and widgets embedded in a desktop. Those of ordinary skill in the art may devise many scenarios wherein the techniques presented herein may be utilized.

D2. Gesture Variations

A second aspect that may vary among embodiments of these techniques relates to variations in the gestures detectable by such techniques.

As a first variation of this second aspect, the gestures may be associated with particular edges 202 of a display 104. As a first such example, the first location 204 may comprise a location near a corner of the display 104 adjoining two selected edges 202 of the display 104, and the second location 206 may comprise a midpoint of a selected edge 202 (or vice versa). As a second such example, the first location 204 may comprise a location near an edge 202 of the display 104, and the second location 206 may comprise a location between the first location 204 and the center of the display 104.

As a second variation of this second aspect, the gesture may comprise additional forms of input combined with the positioning of the pointer 116 in the first location 204 and the movement 220 of the pointer 116 to the second location 204. As a first such example, the gesture may involve hovering the pointer 116 at the first location 204 and/or the second location 206. As a second such example, the gesture may involve activating the pointer 116 at the first location 204 and/or the second location 206 and/or therebetween, e.g., clicking a button of a mouse at the first location 204 and/or the second location 206, or performing a "drag" operation from the first location 204 to the second location 206. As a third such example, the gesture may also involve other forms of input through other input devices, such as depressing a key on a keyboard while performing the gesture.

As a third variation of this second aspect, the graphical computing environment 106 may visually indicate the availability of the gesture in various ways. As a first such example, the graphical computing environment 106 may present a visual indicator at the first location 204 of the user interface 120 or the availability of the gesture, such as an interactive or non-interactive target. Alternatively, the graphical computing environment 106 may refrain from presenting visual indicators (e.g., a "chromeless" implementation of the gesture). As a second such example, between the initiation of the gesture at the first location 204 and the completion of the gesture at the second location 206, the graphical computing environment 106 may present a visual indication of the second location 206 in order to encourage the completion of the gesture, or may refrain from presenting any such visual indication in order to promote the "chromelessness" of the graphical computing environment 106.

As a particular example of this third variation of this second aspect, and as illustrated in the exemplary scenario of FIG. 2, the visual indication of the second location 206 may comprise a preview 216 of the user interface 120, such as a portion of the user interface 120 (e.g., a textual or pictorial description of the user interface 120; a subset of visual controls of the user interface 120 that indicate the type of functionality exposed by the user interface 120; a non-interactive version of the user interface 120, such as a thumbnail or a partially transparent version of the user interface 120; and/or a presentation of the visual controls 118 of the user interface 120 without an isolating background of the user interface 120). As the movement 220 of the pointer 116 from the first location 204 to the second location 206 is detected, the preview 216 may be replaced with the user interface 120. As a further example, if the user interface 120 comprises a user interface region extending to the edge 202 of the display 104, the preview 216 may be positioned at the second location 206 such that it does not extend to the edge 202 of the display 104, thereby avoiding an occlusion of any other visual elements that are positioned near the edge 202 of the display 104. As an additional option, the preview 216 may only be presented after detecting a "hovering" of the pointer 116 within the first location 204, measured as a hover duration 214 from the arrival of the pointer 116 at the first location 204. This option may inform an inexperienced user 112 of the availability of the user interface 120 and the completion of the associated gesture, while also enabling an experienced user 112 to invoke the user interface 120 without having to "hover" the pointer 116 at the first location 204 or view the preview 216.

As a fourth variation of this second aspect, the detection of the gesture within the graphical computing environment 106 may be performed in many ways. As a first such example, the graphical computing environment 106 may endeavor to detect an initiation of the gesture by, while not in the user interface suggestion mode 210, continuously comparing the location of the pointer 106 with the first location 204 of the gesture; and, while in the user interface suggestion mode 210, continuously evaluating pointer input of the pointer 116 to detect a movement 220 to the second location 206. As a second such example, the graphical computing environment 106 may not continuously monitor the pointer input of the pointer 116, but may include a trigger that, when activated, indicates input correlated with the gesture. For example, the graphical computing environment 106 may be particularly configured to display a set of regions (e.g., windows 110), and may additionally include a window 110 covering the area of the first location 204 and having no visual appearance. The graphical computing environment 106 may already be generally configured to detect the entry of a pointer 116 into the areas of respective windows 110, and to notify such windows 110 of such pointer input. The non-visible window 110 positioned at the first location 116 may interpret notification of the entry of the pointer 116 into the area of the window 110 as an initiation of the gesture. Moreover, the non-visible window 110 may send the pointer input to any visual controls near (e.g., below) the window, in case such pointer input is intended for such underlying visual controls and not as part of the gesture.

As a fifth variation of this second aspect, if the user 112 does not complete an initiated gesture, the graphical computing environment 106 may construe the input as an inadvertent initiation of the gesture and a cancellation of the user interface suggestion mode 210. As a first such example, upon failing to detect the movement 220 of the pointer 116 to the second location 206 within a gesture completion duration from entering the user interface suggestion mode 210, the graphical computing environment 106 may cancel the user interface suggestion mode 210. As a second such example, upon detecting input other than the movement 220 of the pointer 116 to the second location 206 while in the user interface suggestion mode 210 (e.g., movement of the pointer 116 away from the second location 206, an activation of the pointer 116 such as a depression of a mouse button, or input from another input device such as a keyboard), the graphical computing environment 106 may cancel the user interface suggestion mode 210.

As a sixth variation of this second aspect, the details of such gestures may be adjusted for execution on a device 102 having two or more displays 104. In many such scenarios, the displays 104 may be logically arranged to reflect a single logical display. For example, a logical display may comprise a first logical display space and a second logical display space that are logically adjacent, such that moving the pointer 116 past the right edge of the first logical display space causes the pointer 116 to emerge from the left edge of the second logical display space. The arrangement of the logical display spaces within the logical display may or may not be consistent with the physical arrangement of such displays 104; e.g., while it may be advantageous to position a first display 104 presenting the first logical display space adjacent to and to the left of a second display 104 presenting the second logical display space, the displays 104 may be located in other physical arrangements, such as the first display 104 above, below, or to the right of the second display 104. In relation to the techniques presented herein, in multi-display scenarios, an edge 202 of a logical display space may operate not as a hard boundary that resists overshooting of the pointer 116 past the edge 202, but rather as a portal to a second logical display space, such that even minimal overshooting of the first location 204 causes the pointer 116 to move past the first location 204 and onto a second logical display space. Accordingly, the edge 202 may be less readily accessible (due to Fitts' Law), and the gesture may be adapted to improve the accessibility of the associated functionality.

As a first example of this sixth variation, the gesture may be adjusted in order to distinguish an initiation of a gesture from a transition between the logical display spaces presented by different displays 104 that happens to pass through the first location 204. For example, the gesture may be initiated only upon detecting a movement from within the logical display space of a display 104 to a first location 204 within the same logical display space of the same display 104.

As a second example of this sixth variation, in order to adjust for inadvertently overshooting the first location 204 within a first logical display space of a first display 104 that is logically adjacent to a second logical display space of a second display 104, the first location 204 may be extended into the second logical display space of the second display 104. For example, the first location 204 may be adapted to include an edge region, comprising a first region portion near an edge 202 of the first logical display space of the first display 104, and a second region portion near an adjacent edge 204 of the second logical display space of the second display 104 having a second region portion edge that is adjacent to a first region portion edge of the first region portion; and the detection of the pointer 116 within either region portion of the edge region may be construed as the positioning of the pointer 116 at the first location 204. This detection, followed by the movement 220 of the pointer 116 to the second location 206, may cause the user interface 120 to appear in the first logical display space of the first display 106.

Figure 5:
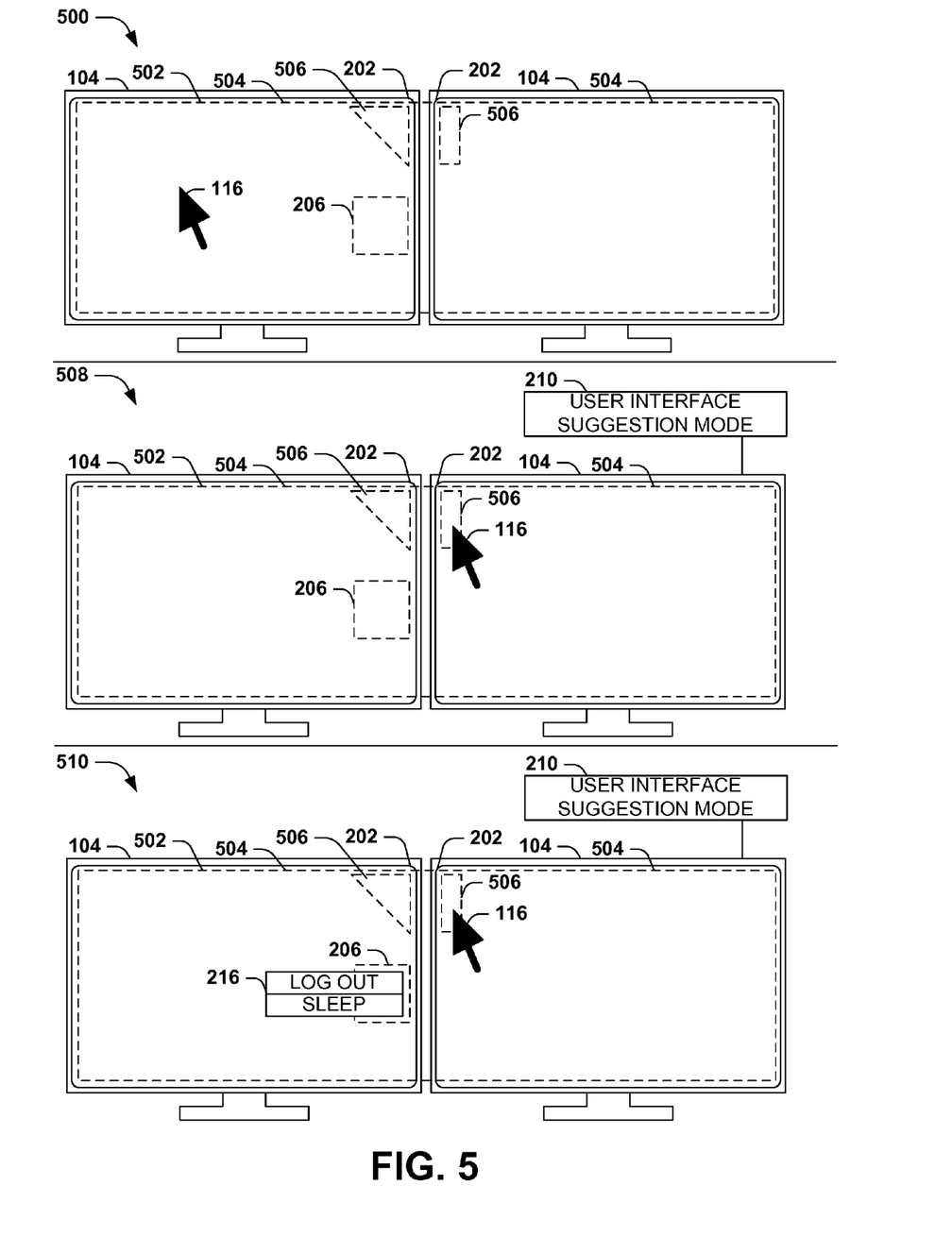
FIG. 5 is an illustration of an exemplary scenario featuring an invocation of a user interface within a graphical computing environment presented on a plurality of displays.

FIG. 5 presents an illustration of an exemplary scenario (presented as a series of time points) featuring the implementation of the gestures presented herein on a device 102 having two displays 104 configured to share a logical display 502 comprising a first logical display space 504 presented on a first display 104 and a second logical display space 504 presented on a second display 104. At a first time point 500, the first location 204 in which a gesture may be initiated is defined as an edge region comprising a first region portion 506 positioned near a first edge 202 of the first display 104 and a second region portion 506 positioned on a logically (and, coincidentally but not necessarily, also physically) adjacent edge 202 of the second display 104, and may be completed by a movement 220 of the pointer 116 to a second location 206 defined only in the first logical display space 504 on the first display 104. At a second time point 508, when the pointer 116 is positioned within the second region portion 506 of the second display 104, the graphical computing environment 106 may enter a user interface suggestion mode 210 (e.g., at a third time point 510 following a hovering of the pointer 116 in the second region portion 605, presenting a preview 216 of the user interface 120 at the second location 206 on the first display 104). The completion of the gesture through a movement 220 from either region portion 506 to the second location 206 may result in the presentation of the user interface 120 on the first display 104.

Additional variations of this second variation of this sixth aspect may be included to account for the inclusion of the second region portion in the edge region. As a first such example, if the presentation of a preview 216 is preceded by a hovering of the pointer 116 in the first region portion, the hover duration may be different when the pointer 116 is positioned in the second region portion on the second display 104 (e.g., by defining a first hover duration for the first region portion, and a second hover duration for the second region portion that is different from the first hover duration). As a second such example, if the device 102 is configured to terminate the user interface suggestion 210 if the pointer 116 is not moved from the first region portion to the second location 206 within a gesture completion duration, this gesture completion duration may be extended if the pointer 116 is positioned within the second region portion (e.g., to account for the further length of the movement 220 when initiated from a second display 106). Thus, the device 102 may define a first gesture completion duration when the gesture is initiated in the first region portion, and a second gesture completion duration (which is greater than the first gesture completion duration) when initiated in the second region portion. As a third such example, the completion of this gesture may have various effects within the second logical display space of the second display 104. For example, in addition to causing the device 104 to present the first user interface 120 at the second location 206 on the first display 104, the gesture may cause the same user interface 120 to be presented at a location on the second display 104; a different user interface 120 to be presented on the second display 104; or no effect with respect to the second display 104. Those of ordinary skill in the art may devise many such variations of the gestures in accordance with the techniques presented herein.

E. Exemplary Computing Environment

Figure 6:
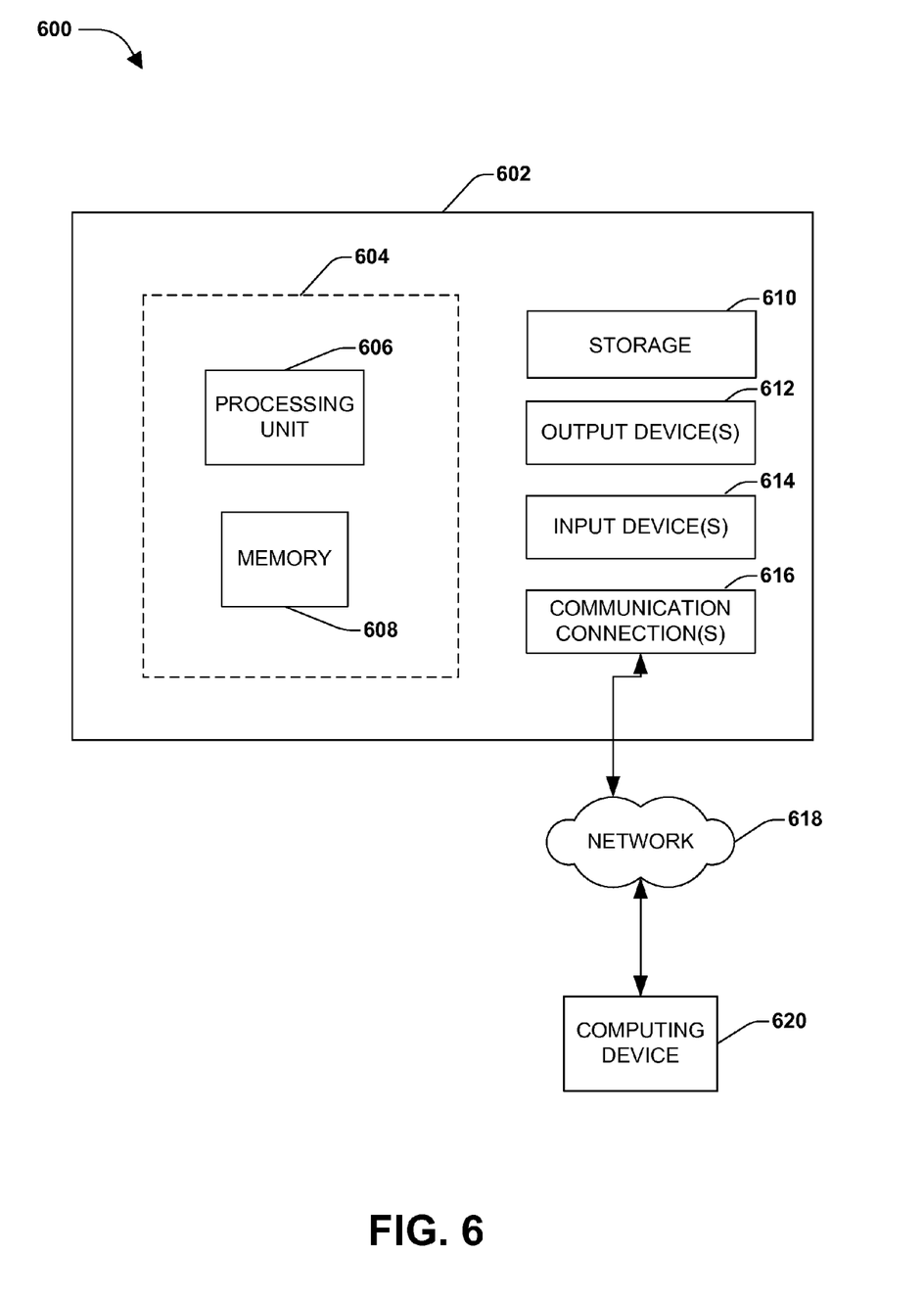
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 602 configured to implement one or more embodiments provided herein. In one configuration, computing device 602 includes at least one processing unit 606 and memory 608. Depending on the exact configuration and type of computing device, memory 608 may be volatile (such as RAM, for example), non-volatile (such as ROM, flash memory, etc., for example) or some combination of the two. This configuration is illustrated in FIG. 6 by dashed line 604.

In other embodiments, device 602 may include additional features and/or functionality. For example, device 602 may also include additional storage (e.g., removable and/or non-removable) including, but not limited to, magnetic storage, optical storage, and the like. Such additional storage is illustrated in FIG. 6 by storage 610. In one embodiment, computer readable instructions to implement one or more embodiments provided herein may be in storage 610. Storage 610 may also store other computer readable instructions to implement an operating system, an application program, and the like. Computer readable instructions may be loaded in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media may be part of device 602.

Device 602 may also include communication connection(s) 616 that allows device 602 to communicate with other devices. Communication connection(s) 616 may include, but is not limited to, a modem, a Network Interface Card (NIC), an integrated network interface, a radio frequency transmitter/receiver, an infrared port, a USB connection, or other interfaces for connecting computing device 602 to other computing devices. Communication connection(s) 616 may include a wired connection or a wireless connection. Communication connection(s) 616 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 602 may include input device(s) 614 such as keyboard, mouse, pen, voice input device, touch input device, infrared cameras, video input devices, and/or any other input device. Output device(s) 612 such as one or more displays, speakers, printers, and/or any other output device may also be included in device 602. Input device(s) 614 and output device(s) 612 may be connected to device 602 via a wired connection, wireless connection, or any combination thereof. In one embodiment, an input device or an output device from another computing device may be used as input device(s) 614 or output device(s) 612 for computing device 602.

Components of computing device 602 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 602 may be interconnected by a network. For example, memory 608 may be comprised of multiple physical memory units located in different physical locations interconnected by a network.

Those skilled in the art will realize that storage devices utilized to store computer readable instructions may be distributed across a network. For example, a computing device 620 accessible via network 618 may store computer readable instructions to implement one or more embodiments provided herein. Computing device 602 may access computing device 620 and download a part or all of the computer readable instructions for execution. Alternatively, computing device 602 may download pieces of the computer readable instructions, as needed, or some instructions may be executed at computing device 602 and some at computing device 620.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting a user interface in a graphical user environment on a device defining a first threshold distance and a second threshold distance that is greater than the first threshold distance and having a processor, a display, and a pointing device associated with a pointer, the method comprising:
   executing on the processor instructions configured to:
      upon detecting a positioning of the pointer at a first location within the first threshold distance of an edge of the display:
         enter a user interface suggestion mode; and
         at a second location that is within the second threshold distance of the first location and that is not within the first threshold distance of the first location, present a preview of a user interface that is available at the second location; and
      upon detecting, while in the user interface suggestion mode, a movement of the pointer from the first location to the second location and absent user interaction with the preview of the user interface, present the user interface at the second location.

2. The method of claim 1:
   the first location comprising a location within the first threshold distance of a corner of the display adjoining two selected edges of the display; and
   the second location comprising a midpoint of a selected edge.

3. The method of claim 1, the instructions further configured to refrain from presenting a visual indicator of the user interface at the first location.

4. The method of claim 1:
   the instructions further configured to position a non-visible detection region at the first location; and
   detecting the positioning comprising: detecting a movement of the pointer into the non-visible detection region.

5. The method of claim 1:
   the user interface comprising a user interface region extending to the edge of the display; and
   the preview comprising a portion of the user interface region and not extending to the edge of the display.

6. The method of claim 1, the instructions further configured to present the preview upon detecting a hovering, for a hover duration, of the pointer at the first location.

7. The method of claim 1, the instructions further configured to, upon failing to detect the movement of the pointer to the second location within a gesture completion duration from entering the user interface suggestion mode:
   remove the preview, and
   cancel the user interface suggestion mode.

8. The method of claim 1, the instructions further configured to, upon detecting input other than the movement of the pointer to the second location while in the user interface suggestion mode:
   remove the preview, and
   cancel the user interface suggestion mode.

9. The method of claim 1:
the computing environment presenting at least one visual control within a threshold distance of the first location; and
the instructions configured to, upon canceling the user interface suggestion mode, send the input to a visual control within the threshold distance of the first location.

10. The method of claim 1, the computing environment presenting a logical display comprising at least two logical display spaces presented by a display of the device.

11. The method of claim 10, detecting the positioning of the pointer at a first location within a threshold distance of an edge of a display comprising:
detecting a movement of the pointer from within the logical display space of a display to the first location within the threshold distance of an edge of the logical display space of the display.

12. The method of claim 10:
a first edge of a first logical display space presented by a first display positioned, within the logical display, adjacent to a second edge of a second logical display space presented by a second display; and
detecting the positioning of the pointer at a first location within a threshold distance of the first edge comprising:
detecting the positioning of the pointer within an edge region comprising:
a first region portion within a threshold distance of the first edge of the first logical display space; and
a second region portion within a threshold distance of the second edge of the second logical display space having a second region portion edge that is adjacent to a first region portion edge of the first region portion.

13. The method of claim 12, the instructions further configured to:
upon detecting a hovering, for a first hover duration, of the pointer in the first region portion, present a preview of the user interface at the second location; and
upon detecting a hovering, for a second hover duration that is different from the first hover duration, of the pointer in the second region portion, present the preview of the user interface at the second location.

14. The method of claim 12, the instructions further configured to:
upon failing to detect, while the pointer is in the first region portion, the movement of the pointer to the user interface within a first gesture completion duration from entering the user interface suggestion mode, cancel the user interface suggestion mode; and
upon failing to detect, while the pointer is in the second region portion, the movement of the pointer to the user interface within a second gesture completion duration from entering the user interface suggestion mode, the second gesture completion duration longer than the first gesture completion duration, cancel the user interface suggestion mode.

15. The method of claim 12, the instructions further configured to, upon detecting the positioning of the pointer within the edge region:
present a first user interface at a first second location within the first logical display space; and
present a second user interface a second location within the second logical display space.

16. The method of claim 1:
the pointer associated with a pointing input mode selected from a pointing input mode set comprising:
an absolute pointing input mode, and
a relative pointing input mode; and
entering the user interface suggestion mode comprising:
upon detecting a positioning of the pointer at a first location within a threshold distance of an edge of the display while the pointer is associated with a relative pointing input mode, enter the user interface suggestion mode.

17. The method of claim 16, the instructions further configured to, upon detecting, while the pointer is associated with an absolute pointing input mode, input at a position of the pointing device corresponding to the first location, present the user interface on the display.

18. A device that presents a user interface in a graphical user environment on a device defining a first threshold distance and a second threshold distance that is greater than the first threshold distance, the device comprising:
a processor,
a display,
a pointing device associated with a pointer, and
a memory storing instructions that, when executed by the processor, provide a system comprising:
a user interface suggester comprising instructions stored in the memory that, when executed on the processor, cause the device to, upon detecting a positioning of the pointer at a first location within the first threshold distance of an edge of the display:
enter a user interface suggestion mode; and
at a second location that is within the second threshold distance of the first location and that is not within the first threshold distance of the first location, present a preview of a user interface that is available at the second location; and
a user interface presenter comprising instructions stored in the memory that, when executed on the processor, cause the device to, upon detecting, while in the user interface suggestion mode, a movement of the pointer from the first location to the second location and absent user interaction with the preview of the user interface, present the user interface at the second location.

19. The method of claim 10, where presenting the user interface at the second location further comprises: replacing the preview at the second location with the user interface.

20. A method of presenting a user interface in a graphical user environment on a device defining a first threshold distance and a second threshold distance that is greater than the first threshold distance and having a processor, a display, and a pointing device associated with a pointer, the method comprising:
executing on the processor instructions configured to:
upon detecting a positioning of a pointer within the graphical user environment at a first location within the first threshold distance of an edge of the display:
record a start time of a user interface suggestion mode, and
at a second location that is within the second threshold distance of the first location and that is not within the first threshold distance of the first location, present a preview of a user interface that is available at the second location; and
upon detecting, within a time limit measured from the start time, a movement of the pointer from the first location to the second location and absent user interaction with the preview of the user interface, present the user interface at the second location; and
upon the time limit from the start time elapsing without a movement of the pointer to the second location, exit the user interface suggestion mode.

* * * * *